United States Patent
Kemnitz et al.

Patent Number: 5,113,817
Date of Patent: May 19, 1992

[54] PISTON WITH SPECIFIC LAND CHARACTERISTICS

[75] Inventors: Peter Kemnitz, Kernen i.R.; Michael Ullrich, Ludwigsburg; Hanspeter Wieland, Ditzingen, all of Fed. Rep. of Germany

[73] Assignee: Mahle, GmbH, Stuttgart, Fed. Rep. of Germany

[21] Appl. No.: 694,413

[22] Filed: May 1, 1991

[30] Foreign Application Priority Data

May 8, 1990 [DE] Fed. Rep. of Germany ...... 4014704

[51] Int. Cl.⁵ .................................. F02F 3/00/3/22
[52] U.S. Cl. ........................... 123/193.6; 92/233; 92/216
[58] Field of Search .......... 123/193 P; 92/189, 190, 92/177, 233, 208, 216, 219

[56] References Cited

U.S. PATENT DOCUMENTS

| | | |
|---|---|---|
| 2,601,344 | 6/1952 | Townhill ............... 92/233 |
| 3,463,057 | 8/1969 | Packard et al. ......... 92/233 |
| 3,805,677 | 4/1974 | Clary et al. ............ 92/216 |
| 4,013,057 | 3/1977 | Guenther .............. 123/193 P |
| 4,831,919 | 5/1989 | Bruni .................. 123/193 P |
| 4,989,559 | 2/1991 | Fletcher-Jones ......... 123/193 P |

FOREIGN PATENT DOCUMENTS

873331  8/1949  Fed. Rep. of Germany.

Primary Examiner—E. Rollins Cross
Assistant Examiner—M. Macy
Attorney, Agent, or Firm—Collard, Roe & Galgano

[57] ABSTRACT

A piston for an internal combustion engine with a separate head and skirt which are joined by a piston pin. The ring belt extends downward from head and terminates above the pin. The space between the lower edge of the ring belt and a section of the head defines a cooling oil ring space. A depression is formed in the head and is partly defined by the section. The second land has the largest diameter and exclusively guides the piston. The height of the second land is in the range of three to seven percent of the piston diameter. The diametrical second land clearance is 1.5% to 2.5%. The diametrical third land clearance is one percent of the piston diameter. The diametrical top land clearance is in the range of 1.5 mm to 2.0 mm.

15 Claims, 3 Drawing Sheets

PISTON WITH SPECIFIC LAND CHARACTERISTICS

BACKGROUND OF THE INVENTION

Field of the Invention

The invention relates to a cooled piston for internal combustion engines with a separate piston head and piston skirt. More particularly, it relates to a steel or iron piston head joined to the piston skirt by means of the piston pin. Specific land characteristics are provided for the piston head.

SUMMARY OF THE INVENTION

It is an object of the present invention to provide a piston which has lower oil consumption.

It is a further object of the present invention to provide a piston which has improved efficiency due to better guidance.

These and other related objects are attained according to the invention by a piston for internal combustion engines with a separate piston head joined to the piston skirt by the piston pin. For example, the head can be made of steel or iron. A ring belt, into which the ring grooves are set, projects downward from the head and terminates above the pin. The ring belt defines an outer border of a cooling oil ring space. The inner border of the ring space is defined by a section of the head which is an extension of the piston base. This section is located over two hubs which are mounted opposite each other. A depression is formed in the head and base and is partly defined by the section.

The second land diameter is the largest of the land diameters, thus the second land exclusively guides the piston. The height of the second land is in the range of three percent to seven percent of the diameter of the piston. The range is preferably three percent to five percent and ideally, three percent to four percent.

The diametrical land clearance of the second land is generally in the range of 1.5% to 2.5% in the cold state. The diametrical land clearance of the second land is generally in the range of one percent of the piston diameter in the cold state. The piston has three ring grooves, the bottom groove being an oil ring groove. The fourth land is oval shaped with the short diameter lying in the direction of the pin axis. The piston pin offset would be generally 1 mm. Alternately (with circular lands), the piston pin offset would be generally in the range of 1.0 mm to 1.8 mm. The top ring groove is provided with a groove angle generally in the range of twenty minutes to forty minutes e.g., full keystone groove with groove angle of twenty to forty minutes. The diametrical land clearance of the top land is generally in the range of 1.5 mm to 2 mm.

BRIEF DESCRIPTION OF THE DRAWINGS

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention.

DETAILED DESCRIPTION OF PREFERRED EMBODIMENTS

Figure 1:
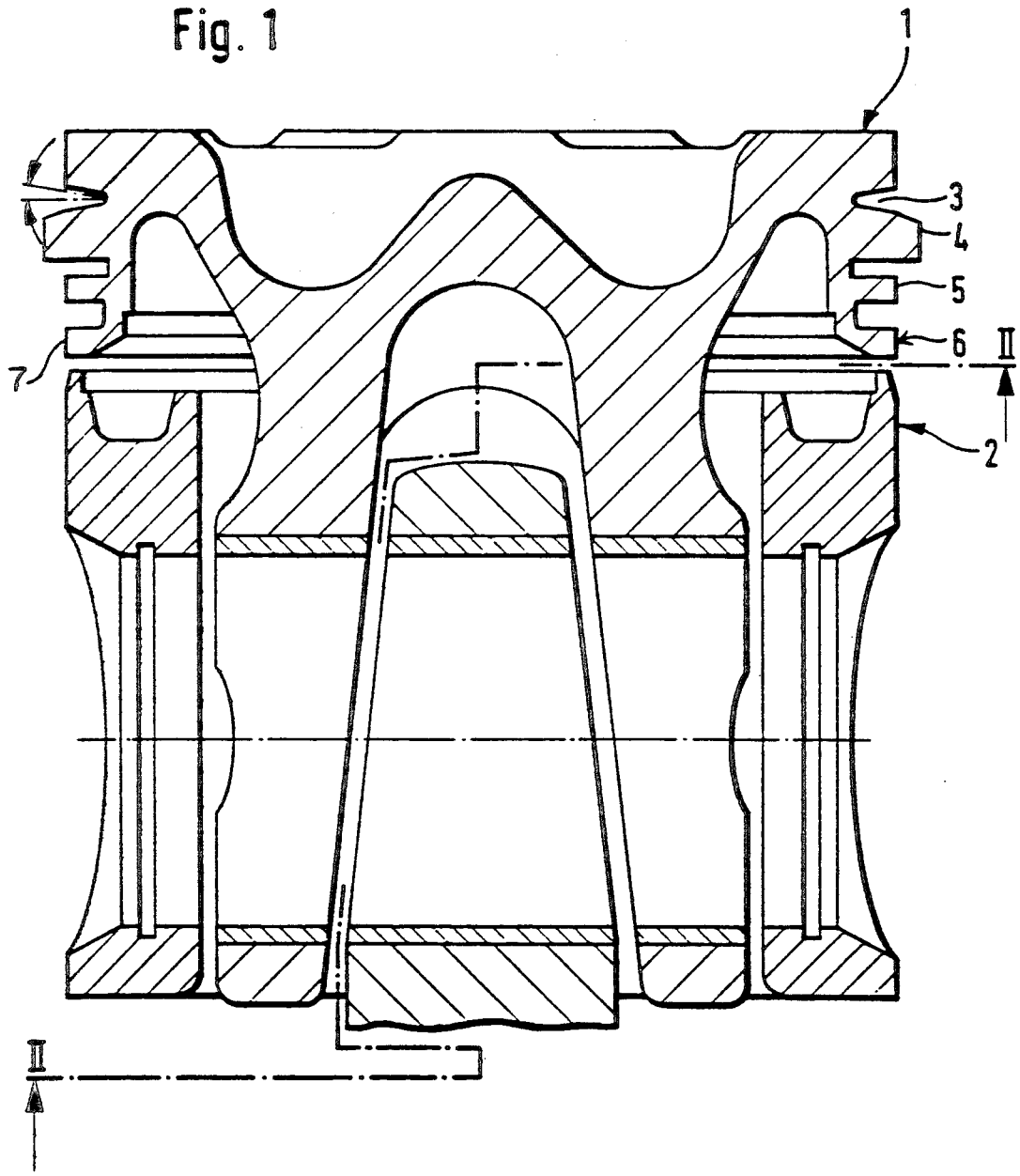
FIG. 1 is a cross-sectional view of a piston head and skirt embodying the present invention.
Figure 2:
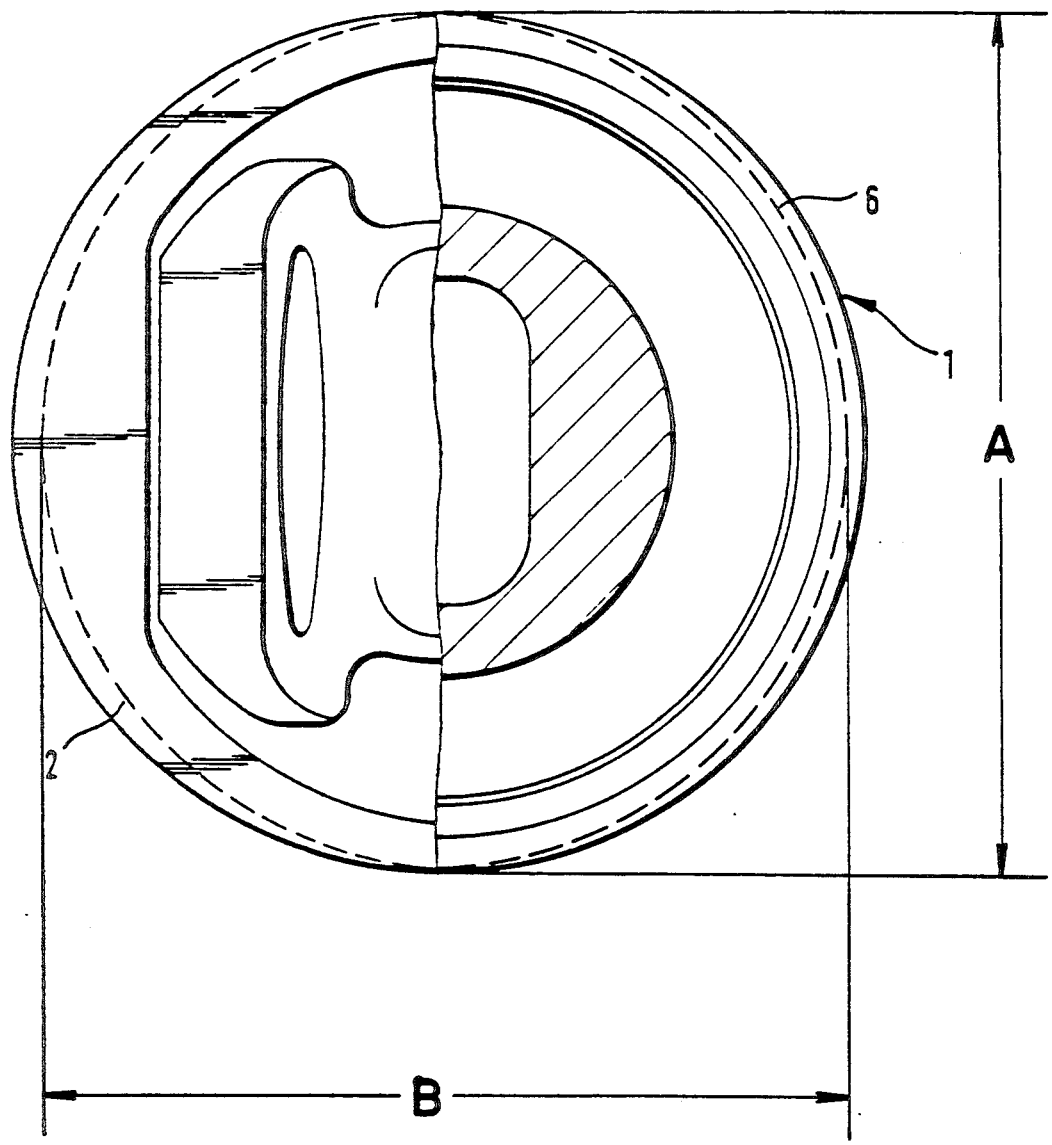
FIG. 2 is a bottom elevational view, in part section and shows the fourth land as oval shaped.

Turning now in detail to the drawings, in particular FIGS. 1 and 2, there is illustrated a piston embodying the present invention consisting of a head 1 and a skirt 2. Head 1 and skirt 2 are only connected together by means of a piston pin (not shown for reasons of clarity).

A ring belt 6, in which a ring groove 3 is set, extends downward from the piston base, and ends axially a short distance above skirt 2. Ring belt 6 defines an outer border of a cooling oil ring space. The inner border of cooling oil ring space is defined by a section of the head 1 which extends from the piston base. The section is located over two hubs opposite each other, in which the pin is mounted. The free end of the ring belt is not rigidly connected to the section of head 1 in the radial direction, thus creating an open space. This space can also be closed, i.e., connected to the head. In the center of the head 1 there is a depression molded into the piston.

The second land diameter 4 is the largest of all land diameters and exclusively guides the piston in the bore. The height of the second land is generally between three percent and seven percent of the diameter of the piston. Preferably, the height is three percent to five percent and ideally three percent to four percent of the piston diameter. The diametrical land clearance of the second land is generally in the range of 1.5% to 2.5%. The diametrical land clearance of the third land 5 is generally in the range of one percent of the piston diameter in the cold state.

Figure 3:
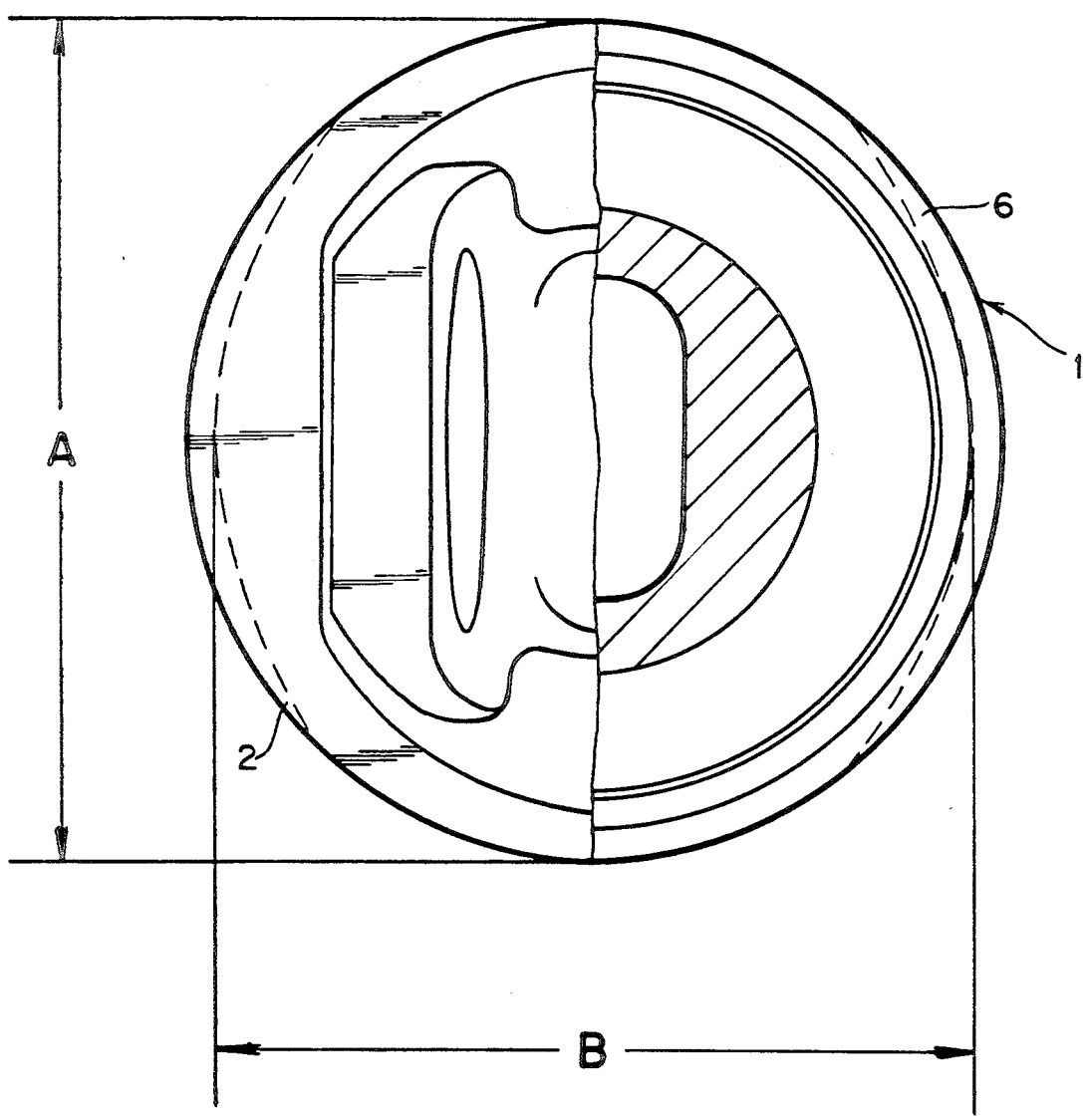
FIG. 3 is a bottom elevational view, in partial section, and shows the fourth land as generally circular.

The piston has three ring grooves, the lowermost being provided as an oil ring groove. The fourth land 7 is oval-shaped with the short diameter lying in the pin direction with a piston pin offset of generally 1 mm as shown in FIG. 2. Alternatively as shown in FIG. 3, a generally circular piston can have a piston pin offset of 1.0 mm to 1.8 mm. The short diameter of the fourth land can vary by 1.0 mm to 1.8 mm with respect to the other lands.

The top ring groove is provided with a groove angle generally in the range of twenty minutes to forty minutes, e.g., full keystone groove with groove angle of twenty to forty minutes. In a preferred embodiment, the groove angle is thirty minutes. The diametrical land clearance of the top land is generally in the range of 1.5 mm to 2.0 mm.

While only several embodiments of the present invention have been shown and described, it is to be understood that many changes and modifications may be made thereunto without departing from the spirit and scope of the invention as defined in the appended claims.

What is claimed is:

1. In an improved piston for an internal combustion engine with a separate head and skirt which are joined by a pin, a ring belt in which three ring grooves are set extends downward from a top portion of the head and terminates above the pin, the ring belt includes a top land, a second land, a third land and a fourth land alternating with the ring grooves, the ring belt defines an outer border of a cooling oil ring space, a section of the head extending from a piston base defines an inner border of the space. the section is located over two hubs being situated opposite each other in a radially outward direction in which the pin is mounted. a bottom free end of the ring belt is detached from the section. a depression is formed in the head and base and is partly defined by the section. the improvement comprising the second land from the top having a diameter larger than a diameter of the top land. third land or fourth land for exclusively guiding the piston.

2. The piston according to claim 1. wherein the head is made of steel.

3. The piston according to claim 1, wherein the head is made of iron.

4. The piston according to claim 1. wherein the height of the second land is in the range of three percent to seven percent of the piston diameter.

5. The piston according to claim 4, wherein the height of the second land is in the range of three percent to five percent of the piston diameter.

6. The piston according to claim 5, wherein the height of the second land is in the range of three percent to four percent of the piston diameter.

7. The piston according to claim 1. wherein the diametrical second land clearance is in the range of 1.5% to 2.5% of the piston diameter in the cold state.

8. The piston according to claim 1. wherein the diametrical third land clearance is generally one percent of the piston diameter in the cold state.

9. The piston according to claim 1. wherein the fourth land is oval-shaped with the short diameter of the oval lying in the pin direction. with a piston pin offset greater than 1 mm.

10. The piston according to claim 1. wherein the piston pin offset is in the range of 1.0 mm to 1.8 mm.

11. The piston according to claim 1. wherein the top ring groove has a groove angle in the range of twenty minutes to forty minutes.

12. The piston according to claim 11, wherein the ring groove has a groove angle of thirty minutes.

13. The piston according to claim 1, wherein the diametrical top land clearance is in the range of 1.5 mm to 2.0 mm.

14. The piston according to claim 1, wherein the fourth land is oval-shaped with the short diameter of the oval lying in the pin direction, and a difference of greater than about 1 mm between the short diameter and the long diameter.

15. The piston according to claim 1, wherein the fourth land is generally circular with two opposite areas of the perimeter having a diameter of 1 mm to 1.8 mm less than the diameter of the other circular areas of the fourth land.

* * * * *

UNITED STATES PATENT AND TRADEMARK OFFICE
CERTIFICATE OF CORRECTION

PATENT NO. : 5,113,817
DATED : May 19, 1992
INVENTOR(S) : Peter Kemnitz et al

It is certified that error appears in the above-identified patent and that said Letters Patent is hereby corrected as shown below:

Title page, item 57 (Abstract), line 11, delete "1.5%" and insert --.15%--; and delete "2.5%" and insert --.25%--.

Column 1, line 41, delete "1.5%" and insert --.15%--; and delete "2.5%" and insert --.25%--.

Column 2, line 33, delete "1.5%" and insert --.15%--; and delete "2.5%" and insert --.25%--.

Column 3, line 27, delete "1.5%" and insert --.15%--; and line 28, delete "2.5%" and insert --.25%--.

Signed and Sealed this

Fourth Day of October, 1994

Attest:

BRUCE LEHMAN

Attesting Officer

Commissioner of Patents and Trademarks